Sept. 13, 1955     P. J. IMSE     2,717,520
AUTOMATIC SLACK TAKE-UP DEVICE FOR
SPROCKET CHAINS AND THE LIKE
Filed July 2, 1953
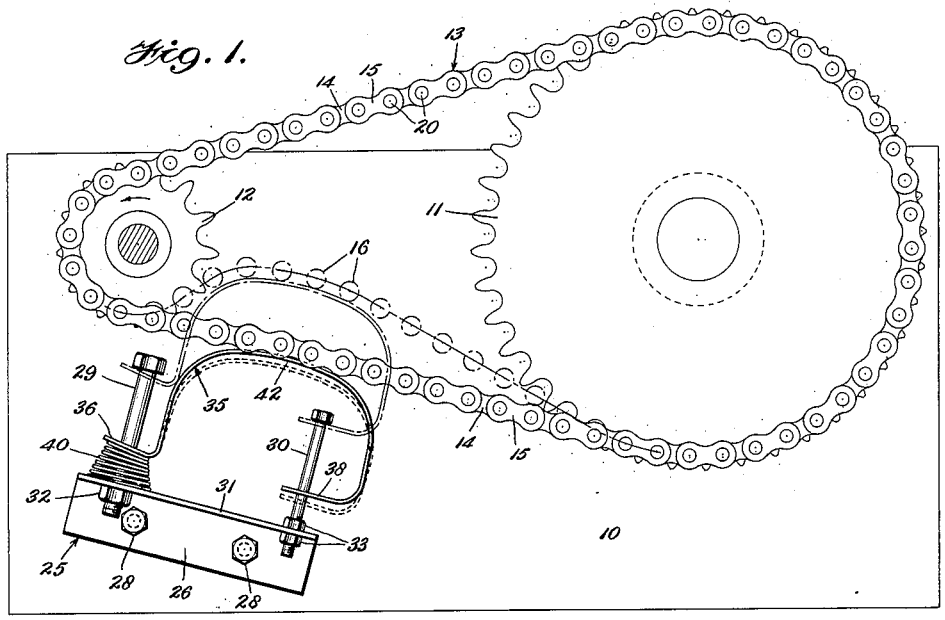
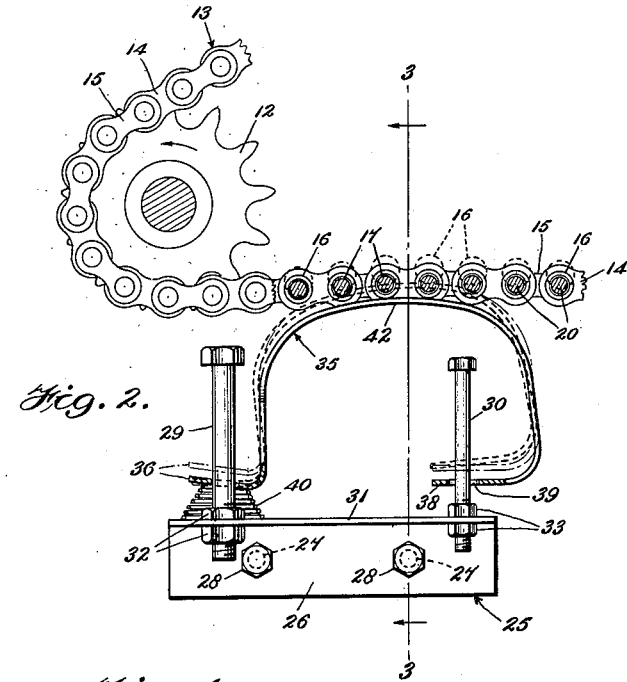
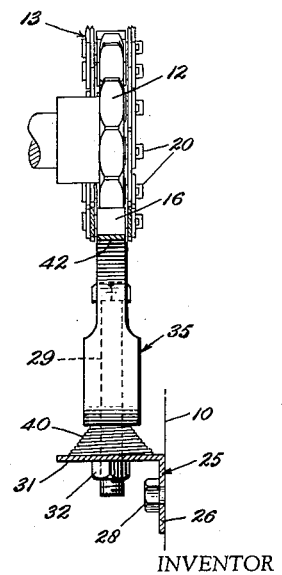
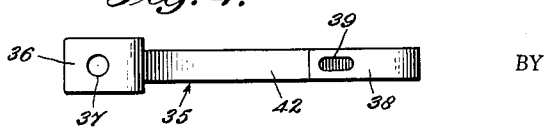
INVENTOR
Philip J. Imse,
BY
ATTORNEY

United States Patent Office 2,717,520
Patented Sept. 13, 1955

2,717,520

AUTOMATIC SLACK TAKE-UP DEVICE FOR SPROCKET CHAINS AND THE LIKE

Philip J. Imse, Wauwatosa, Wis., assignor to Chain Belt Company, Milwaukee, Wis., a corporation of Wisconsin Application July 2, 1953, Serial No. 365,652

4 Claims. (Cl. 74—242.11)

This invention relates to automatic slack take-up devices for sprocket chains and the like, and has for its principal object the provision of an improved mechanism of this character which is of simple and relatively inexpensive construction and which will operate with uniform effectiveness in any position in which it may be disposed, thereby adapting it for use with all drives whether they be horizontal, vertical or inclined.

One exemplification of the invention is illustrated in the accompanying drawing forming a part of this specification, in which like reference characters designate like parts in all the views, and in which:

Figure 1 is a side elevational view of a conventional chain drive having one of the present slack take-up devices operatively associated therewith;

Fig. 2 is an enlarged elevational view, partly broken away and in section, of the take-up device and a portion of the chain drive, illustrating the action of said device in taking up slack in the chain;

Fig. 3 is a cross sectional view on the plane indicated by the line 3—3 in Fig. 2, looking in the direction of the arrows; and Fig. 4 is an inverted plan view of the resilient chain engaging strip or take-up element.

Referring to said drawing in greater detail, 10 indicates any conventional machine or apparatus equipped with a chain drive comprising a driven sprocket 11, a driving sprocket 12 and a sprocket chain 13 trained about said sprockets. While the present take-up device is not necessarily limited to use with the specific type of drive shown, for purposes of disclosure a roller chain of a well known form has been illustrated, such chain comprising alternate roller links 14 and pin links 15. Each roller link comprises a pair of spaced rollers 16 journaled on tubular bushings 17 extending between and rigidly carried by the link side bars, while each pin link includes a pair of chain pins 20 carried by its side bars, which pins pass through and are journaled in the bushings 17 of adjacent roller links.

As is well known in the art, even when such a chain is new, there is always some slack in the run of the chain which is traveling from the driving sprocket to the driven sprocket, and this slack gradually increases with continued use of the chain due to wear of the bearing surfaces of the bushings 17 and chain pins 20. If this increased slack is not taken up or compensated the drive not only becomes less efficient but in extreme cases the chains may even jump from the sprockets.

The present device for taking up such slack comprises a supporting member 25, here shown as an angle bracket one web 26 of which is provided with a plurality of holes 27 for the reception of bolts or screws 28 whereby the member may be rigidly secured to the frame or housing of the apparatus 10 in operative relation to the slack run of the chain 13. A pair of longitudinally spaced substantially parallel posts 29 and 30 project from the other web 31 of the bracket member 25, such posts being here shown as comprising standard machine bolts the unheaded end portions of which pass through and are rigidly secured to said web 31 by nuts 32 and 33 respectively.

Mounted upon said posts is a chain-engaging take-up element comprising a resilient strip 35. As here shown this strip is permanently bowed to an approximately C-shape (when viewed in side elevation) with one end portion 36 thereof being turned outwardly and provided with an aperture 37 of such diameter as to freely slidably fit the post 29 when the plane of said end portion is normal to the axis of such post. However, if such end portion be slightly tilted or canted from normalcy to the post axis, as shown in Fig. 1 and in full lines in Fig. 2, the periphery of the aperture 37 crampingly engages the surface of the post and effectively prevents sliding movement of the element 35 on the post.

The other end portion 38 of said element is provided with a slot 39 through which the post 30 projects, as will be clear from Fig. 2, such end portion being freely slidable on the post axially thereof and the slot 39 accommodating a limited amount of movement of said end portion longitudinally of the take-up element but engagement of the side walls of the slot preventing transverse motion of such end portion. A coiled compression spring 40, preferably of the conical telescoping type, is interposed between the flange 31 of the bracket member 25 and the apertured end portion 36 of the element 35, surrounding the post 29, which spring acts to shift said element along the posts toward the chain when the cramping action of the aperture 37 on the post 29 is relieved.

The bracket 25 is mounted on the frame or housing of the machine 10 in relation to the chain drive substantially as shown in Fig. 1, whereby when the chain is new and there is comparatively little slack in its return run, the take-up element 35 will be positioned inwardly on the posts 29 and 30, i. e., adjacent the bracket 25, with the spring 40 more or less fully compressed. Pressure of the chain upon the medial portion 42 of said element 35 tilts or cants the apertured end portion 36 thereof relative to the post 29 and produces the above mentioned cramping engagement of the peripheral wall of the aperture 37 with the post, locking the element to the post against the tendency of the spring 40 to move it outwardly thereon. Said chain pressure also slightly distorts the resilient body portion of said element from its normal shape, placing it under tension.

There is always some vibration or whipping of the slack run of the chain during its operation and the resilience of the element 35 accommodates this, as indicated in dotted lines in Fig. 1, at the same time maintaining constant contact between the element and chain. This resilience also takes up the initial additional slack resulting from wear of the chain parts, but when such wear reaches the stage at which elongation of the chain prevents such slack compensation the pressure of the chain on the take-up element 35 is so reduced that both the distortion of the element from its normal shape and the canting thereof relative to the post 29 are relieved. The said element thus assumes substantially the position indicated in dotted lines in Fig. 2, and since in this position the cramping engagement of the aperture 27 on the post 29 has been relieved, the spring 40 slides the element 35 outwardly on the posts 29 and 30, somewhat as indicated in dot-dash lines in Fig. 2. This movement restores the degree of pressural engagement of the chain with the element necessary to again cant the end portion 36 of the element and lock it to the post 29 in its new position. These advances of the take-up element, each of which actually is relatively small, continue from time to time until the element reaches the position indicated by the dot-dash lines in Fig. 1, where they are stopped by the heads of the bolts or posts 29 and 30, thus preventing unintentional disengagement of the element from the posts. At this point the chain has become so worn that further use of it is inadvisable if not actually dangerous, and it should be replaced.

During the outward movement of the take-up element 35 on the posts 29 and 30, as well as during the vibratory movements of the element due to whipping of the chain, engagement of the slotted end portion 38 of the element with the post 30 maintains the element in alinement with the chain by preventing transverse movements and vibration of the element.

What is claimed is:

1. A device for automatically taking up slack in sprocket chains and the like, comprising a supporting member; a pair of posts rigidly carried by and projecting from said member in spaced parallel relation; chain engaging means movably supported by said posts, comprising an element having a chain engageable part and a portion provided with an aperture slidably fitting one of said posts, the periphery of said aperture being crampingly engageable with such post through canting of the element relative to the post due to chain pressure on the element, whereby to prevent movement of the element on the post during continuance of said pressure, said element also having a portion provided with a slot through which the other of said posts passes; and resilient means acting on said element to advance it along the posts toward the chain upon easing of said chain pressure sufficient to relieve the cramping action of the apertured portion of the element on its post.

2. A device for automatically taking up slack in sprocket chains and the like, comprising a supporting member; a pair of posts rigidly carried by and projecting from said member in spaced substantially parallel relation; chain engaging means movably supported by said posts, comprising a resilient strip having a chain engageable part and an end portion provided with an aperture slidably fitting one of the posts, the periphery of said aperture being crampingly engageable with such post through canting of the strip due to chain pressure thereon whereby to prevent movement of the strip on the post during continuance of said pressure, said strip also having a portion provided with a slot through which the other of said posts passes; and a spring acting on the apertured end portion of the strip to advance it along the posts toward the chain upon easing of said chain pressure sufficient to relieve the cramping action of the apertured portion of the strip on its post.

3. A device for automatically taking up slack in sprocket chains and the like, comprising a supporting member; a pair of posts rigidly carried by and projecting from said member in spaced substantially parallel relation; chain engaging means movably supported by said posts, comprising a longitudinally bowed resilient strip the medial portion of which is engageable with the chain and one end portion of which is provided with an aperture slidably fitting one of the posts, the periphery of said aperture being crampingly engageable with such post through canting of the strip due to chain pressure thereon whereby to prevent movement of the strip on the posts during continuance of said pressure, the other end portion of said strip being provided with a longitudinally extending slot through which the other of said posts passes; and a compression spring interposed between said supporting member and said apertured end portion of the strip and acting on the latter to advance the strip along the posts toward the chain upon easing of said chain pressure sufficient to relieve the cramping action of the apertured end portion of the strip on its post.

4. A device for automatically taking up slack in sprocket chains and the like, comprising a supporting member having a rigid post projecting therefrom; chain engaging means movably supported by said post, comprising a resilient strip having a chain engageable part intermediate its ends, one end portion of such strip being provided with an aperture slidably fitting said post the periphery of which aperture is crampingly engageable with the post through canting of the strip due to chain pressure thereon whereby to prevent movement of the strip on the post during continuance of said pressure; means on said supporting member engaging the other end portion of said strip to guide and prevent transverse vibrations of the strip; and resilient means acting on the apertured end portion of the strip to advance it along the post toward the chain upon slackening of said chain pressure sufficient to relieve the cramping action of said apertured end portion of the strip on the post.

References Cited in the file of this patent

UNITED STATES PATENTS

| 1,777,527 | Morse | Oct. 7, 1930 |
| 2,044,719 | Stegeman | June 16, 1936 |

FOREIGN PATENTS

| 323,697 | Great Britain | Jan. 9, 1930 |